2,967,202
PREPARATION OF VINYL AROMATIC COMPOUNDS

Sterling E. Voltz, Chester, and Sol W. Weller, Drexel Hill, Pa., assignors to Houdry Process Corporation, Wilmington, Del., a corporation of Delaware No Drawing. Filed Aug. 24, 1956, Ser. No. 605,955

2 Claims. (Cl. 260—578)

The present invention relates to the preparation of vinyl aromatic compounds and is chiefly concerned with the dehydrogenation of ethyl benzene compounds containing a substituent ortho to the ethyl group, under conditions favoring dehydrogenation of the ethyl group while largely inhibiting the tendency of such compounds to form 5-membered ring structures by dehydrocyclization.

When o-ethyl aniline is passed in vapor state over certain dehydrogenation catalysts in the presence of hydrogen, the principal product obtained is indole along with minor amounts of dealkylation products. While in some instances minute amounts of o-vinyl aniline may appear in the reaction product, the quantity thereof is at best no more than up to about 1% of the recovered liquid product. When the same catalytic reaction is carried out without hydrogen addition, there is no significant increase in the quantity of vinyl aniline obtained.

It has now been found that dehydrogenation of the alkyl chain of an o-substituted alkyl benzene containing 2 or more carbon atoms in the alkyl group, can be effected while inhibiting the extent of dehydrocyclization, producing thereby ortho-substituted styrene type compounds in acceptable yields. Such inhibition of cyclization between the alkyl group and the ortho substituent of the alkyl benzene is accomplished by carrying out the catalytic dehydrogenation in the presence of inert gas.

Accordingly by the methods of the present invention o-substituted alkyl benzene compounds are reacted in vapor phase over supported noble metal dehydrogenation catalysts in the presence of at least one molar equivalent of inert gas. Typical examples include the conversion of o-ethyl aniline, o-ethyl phenol, o-ethyl thiophenol, and o-ethyl toluene, to the respective vinyl compounds. Homologues of these compounds can be similarly reacted to produce corresponding longer chain alkylene aromatic compounds provided that the alpha and beta carbons of the alkyl chain are free from polar groups. While starting compounds containing polar substituents on the alkyl chain can be dehydrogenated by the described process, it is preferred to employ those o-substituted alkyl monocyclic aromatic compounds in which the polar group, if any be present, is furthest away from the beta carbon atom, since the proximity of such polar groups presents disturbing influences. Moreover, it is preferred to employ starting compounds having no more than 6 carbon atoms in the alkyl chain because of extensive interfering side reactions introduced by the longer chain alkyl aromatic compounds.

Any form of inert gas can be employed as diluent in the reaction to inhibit ring closure, such as the common inert elemental gases, for example nitrogen or helium, or any of the other less common elemental gases of the zero or helium group of the Periodic Table. Carbon dioxide, which is relatively inert, can also be used, but the elemental gases are preferred.

The reaction is carried out at about atmospheric pressure and at temperatures in the range of 450 to 600° C. Supported noble metal catalysts useful in the described process include those comprising 0.1 to 5% by weight platinum or paladium supported on alumina, silica gel, on charcoal or activated carbon, or on magnesia.

The preferred catalysts comprise up to 2% platinum on an activated alumina support substantially free of halide ions or other components promoting acid catalysis. Such catalysts can be prepared by impregnation of the alumina with a solution of platinum nitrate or with solutions of other halide-free platinum salts or complexes, as for example commercial "P-salt"

$$(NO_2)_2 . Pt . (NH_2)_2$$

When the impregnating solution employed is the more usual chloroplatinic acid type or other soluble platinum halide salt or complex, and the alumina impregnated therewith is thereafter subjected to the conventional reduction with hydrogen, the halide is nevertheless retained in the catalyst in chemical association with the alumina or otherwise. Platinum-on-alumina catalysts containing such halide have pronounced activity for promoting acid-catalyzed reactions including isomerization, olefin polymerization and cracking, in addition to the hydrogenation-dehydrogenation function of the platinum. To remove the halide from the platinum-alumina catalyst, accordingly, the catalyst is treated with reducing gas (e.g., hydrogen) and steam, until the halide content is reduced to 0.1% or less halide ion by weight of catalyst; or any other means for assuring halide removal, such as by ion exchange or otherwise, may be employed.

A convenient method for preparing platinum-alumina catalyst free of halide or of low halide content involves subjecting the halide-containing platinum-alumina catalyst to a reducing atmosphere containing 25 to 75 mol percent steam and 10 to 75 mol percent of a reducing gas, such as hydrogen, and if desired or required, a diluent inert gas, such as nitrogen. The treatment with such gaseous mixture is effected at temperatures in the range of 700 to 1000° F. for 1 to 36 hours. A superior catalyst employed in the process of the invention is one thus prepared comprising, prior to steam treatment, 0.5% platinum, 0.5% chloride and 99% gamma alumina.

Catalysts containing other noble metals of the platinum family, such as palladium, can be similarly prepared on alumina employing halide-free impregnating solutions of such noble metal compounds or by subsequent steaming to remove halide.

While alumina-supported platinum or palladium catalysts can be employed which contain small amounts of retained halide originating from the impregnating solution when noble metal halide salts or complexes are used, the acid function contributed by such halide tends to promote various side reactions including polymerization and dehydrocyclization and would result in reduced yields of styrene compounds or necessitate the use of vastly increased quantities of inert gas at least to counteract the tendency toward cyclization. The preferred catalysts, accordingly, are those comprising platinum on alumina containing, if any, less than 0.1% by weight halide.

The benefits of the inert gas are already evidenced when such gas is present in about molar ratio to the o-alkyl benzene compound, and it is preferred to employ 5 to 15 mols of inert gas per mol of such compound. Larger quantities of inert gas are not recommended because any advantages thereof would be offset by reduced throughput for a given reactor size and increased costs of handling. It will be understood, of course, that the inert gas separated from the reaction effluent can be recycled to the process, the desired purity being maintained by replacing a withdrawn side stream thereof with fresh inert gas.

EXAMPLE o-Ethyl aniline was passed over steamed platinum-on-alumina catalyst together with 9 mols helium per mol of the ethyl aniline, at atmospheric pressure, 550° C., and at an hourly space rate of 1 volume ethyl aniline per volume of catalyst packed in a continuous reactor column equipped with a finger condenser providing a Dry Ice trap. Liquid reaction products, separated from gas, were recovered over a period of 4 hours, hourly samples being taken.

The total liquid product recovered constituted 93.1% by weight of the feed, of which the fourth hour sample contained approximately 9% of vinyl aniline, and about 67% of unreacted o-ethyl aniline suitable for recycling. The remainder of the liquid reaction product was composed chiefly of indole together with dealkylation and deamination products of the o-ethyl aniline.

Because of the ease of polymerization of o-vinyl aniline, physical separation thereof from the liquid product by distillation must be carried out at low pressures (several mm. Hg) and in the presence of polymerization inhibitors such as 4-tert-butyl pyrocatechol or other known inhibitors. Separation can also be accomplished by chromatographic adsorption on acidic base-exchange resins.

The catalyst employed in the foregoing example was prepared by treating activated alumina in the form of 4 mm. cylindrical pellets with 10% acetic at room temperature for an hour followed by rinsing in distilled water and thereafter impregnating the pellets with a solution of chloroplatinic acid in an amount to effect a deposit of 0.5% platinum therein. The impregnated pellets were then subjected to an air stream and dried at about 275° F. The dried pellets were then treated with a hydrogen gas stream at about 900° F. for an hour to convert the chloroplatinate to metallic platinum following which the catalyst was dehalided by treatment with a mixture of 10% hydrogen and 90% steam, at 900° F., and again subjected to 100% hydrogen treatment at the same temperature for another hour. The finished catalyst contained 0.1% chloride by weight, 99.4% gamma alumina and 0.5% platinum.

While the yields of o-vinyl aniline per pass in the above example are relatively low, these compare favorably with known methods for obtaining such compound. The commercial processes for production of vinyl anilines are limited to the meta and para compounds which can be prepared by dehydrogenation of the corresponding ethyl compounds without occurrence of cyclization.

By the catalytic dehydrogenation of o-ethyl toluene under the conditions described above, o-vinyl toluene is obtained, the presence of the inert gas being effective in inhibiting the extent of accompanying production of indan and indene ring compounds. Here again because of the ready polymerization of the vinyl toluene care must be exercised in its separation from the reaction liquid.

In general, liquid hourly space velocities of about 1 to 2 volumes reactant per volume of catalyst appear to give best over-all results. At lower space velocities, while higher conversion is had, considerably greater quantities of solid residue ("coke") are deposited on the catalyst and in the case of ethyl aniline, larger proportions of indole are formed with reduced yields of o-vinyl aniline. On the other hand, as space rate is increased, there is increasingly lower conversion of the starting alkyl benzene compound. The effect of time on stream is indicated in the following table showing results in the conversion of o-ethyl aniline in helium under conditions of the above example and at 1 and 2 space rate.

Table 1

| Hourly Space Rate (v./hr./v.) | On-Stream Period (hours) | Analysis Liquid Product (Liq. Vol. Percent) | | |
|---|---|---|---|---|
| | | o-Ethyl Aniline | o-Vinyl Aniline | Indole |
| 1.0 | 1 | 49 | 6 | 39 |
| 1.0 | 2 | 58 | 8 | 31 |
| 1.0 | 3 | 62 | 9 | 27 |
| 1.0 | 4 | 67 | 9 | 22 |
| 2.0 | 1 | 71 | 8 | 17 |
| 2.0 | 2 | 74 | 8 | 16 |
| 2.0 | 3 | 75 | 7 | 17 |
| 2.0 | 4 | 77 | 7 | 16 |

The important effect of the inert gas in suppressing cyclization will be seen by comparison of the results shown in Table 1 with these shown in Table 2 below under substantially the same operating conditions but in the presence of hydrogen instead of helium.

Table 2

| Hourly Space Rate (v./hr./v.) | On-Stream Period (hours) | Analysis Liquid Product (Liq. Vol. Percent) | | |
|---|---|---|---|---|
| | | o-Ethyl Aniline | o-Vinyl Aniline | Indole |
| 1.0 | 1 | 21 | 0.5 | 70 |
| 1.0 | 2 | 38 | 0.9 | 53 |
| 1.0 | 3 | 47 | 1 | 46 |
| 1.0 | 4 | 48 | 1 | 44 |
| 2.0 | 1 | 49 | 0.5 | 38 |
| 2.0 | 2 | 52 | 0.6 | 33 |
| 2.0 | 3 | 54 | 0.5 | 30 |
| 2.0 | 4 | 58 | 0.6 | 25 |

Similar reactions to produce the corresponding alkylene aromatic compounds are carried out under substantially the same operating conditions as above described as in the case of o-ethyl phenol and o-ethyl thiophenol. For the dehydrogenation of o-substituted alkyl benzenes containing 3 or more carbon atoms in the alkyl chain, milder conditions are favored, such as temperatures in the lower portion of the described range.

Obviously many modifications and variations of the present invention as hereinbefore set forth may be made without departing from the spirit and scope thereof and therefore only such limitations should be imposed as are indicated in the appended claims.

What is claimed is:

1. In the method in which ortho vinyl aniline is prepared by the catalytic vapor phase dehydrogenation of ortho ethyl aniline, the improvement whereby formation of indole is inhibited which comprises the steps of: passing a gas stream consisting essentially of a mixture of ortho ethyl aniline and a volume of elemental inert gas larger than the volume of ortho ethyl aniline over a catalyst consisting essentially of activated alumina containing a concentration of platinum within the range from 0.1 to 5% by weight and containing not more than 0.1% by weight chloride, said catalyst being prepared by dechloriding the reduced product from impregnating activated alumina with chloroplatinic acid, said gas stream being passed over said catalyst at about atmospheric pressure at an hourly liquid space rate within the range from about 1 to about 2 volumes of liquid ortho ethyl aniline per volume of catalyst per hour at a temperature within the range from about 450° C. to about 600° C. to dehydrogenate ortho ethyl aniline to form hydrogen and ortho vinyl aniline; withdrawing an effluent gas stream from the catalyst; separating a normally liquid fraction from such effluent gas stream; and distilling such liquid product in the presence of a polymerization inhibitor under vacuum at an absolute pressure of only a few mm. of mercury to separate a technical grade of ortho vinyl aniline.

2. The method of claim 1 in which ortho ethyl aniline is dehydrogenated over a catalyst containing about 0.5% platinum on alumina at about 550° C. at an hourly liquid space rate of about 1 in the presence of about 9 volumes of inert gas per volume of ortho ethyl aniline.

References Cited in the file of this patent

Hansch et al.: Journal of the American Chemical Society, vol. 70, pages 1561 and 1562 relied on (1948).

Hansch et al.: J. Am. Chem. Soc. 73, 3080–2 (1951).